US00RE49384E

(19) United States
(12) Reissued Patent
Sloan et al.

(10) Patent Number: US RE49,384 E
(45) Date of Reissued Patent: Jan. 24, 2023

(54) HELIUM COMPRESSOR WITH DUAL AFTER-COOLERS

(71) Applicant: Sumitomo (SHI) Cryogenics of America, Inc., Allentown, PA (US)

(72) Inventors: R Bruce Sloan, Schnecksville, PA (US); Ralph C. Longsworth, Mount Desert, ME (US)

(73) Assignee: SUMITOMO (SHI) CRYOGENIC OF AMERICA, INC., Allentown, PA (US)

(21) Appl. No.: 17/211,674

(22) Filed: Mar. 24, 2021

Related U.S. Patent Documents

Reissue of:
(64) Patent No.: 10,240,832
Issued: Mar. 26, 2019
Appl. No.: 14/974,741
Filed: Dec. 18, 2015

(51) Int. Cl.

| | |
|---|---|
| ***F25B 9/14*** | (2006.01) |
| ***F25B 43/02*** | (2006.01) |
| ***F25B 31/00*** | (2006.01) |
| ***F25B 49/02*** | (2006.01) |
| ***F25B 9/00*** | (2006.01) |

(52) U.S. Cl.
CPC ..... *F25B 9/14* (2013.01); *F25B 9/002* (2013.01); *F25B 31/004* (2013.01); *F25B 31/006* (2013.01); *F25B 43/02* (2013.01); *F25B 49/025* (2013.01); *F25B 2309/1427* (2013.01); *F25B 2339/047* (2013.01)

(58) Field of Classification Search
CPC ..... F25B 49/025; F25B 43/02; F25B 9/002; F25B 31/006; F25B 31/004; F25B 9/14; F25B 2309/1422; F25B 2339/047
See application file for complete search history.

(56) References Cited

U.S. PATENT DOCUMENTS 2,906,101 A 9/1959 McMahon et al.
6,301,923 B1 * 10/2001 Bonaquist ..... F25B 9/06 62/88
6,488,120 B1 * 12/2002 Longsworth ..... F04B 39/04 184/6.16
7,674,099 B2 * 3/2010 Dunn ..... F04C 18/0207 184/6.16

(Continued)

FOREIGN PATENT DOCUMENTS

DE 3023925 A1 1/1982
WO 2011-019909 A1 2/2011

OTHER PUBLICATIONS

International Preliminary Report on Patentability of the International Searching Authority dated Jun. 28, 2018 from the corresponding International Application No. PCT/US2016/067089.

(Continued)

*Primary Examiner* — Joseph A Kaufman
(74) *Attorney, Agent, or Firm* — Katten Muchin Rosenman LLP

(57) ABSTRACT

This invention relates generally to oil lubricated helium compressor units for use in cryogenic refrigeration systems, operating on the Gifford McMahon (GM) cycle. This invention provides redundancy between water cooling and air cooling if there is a blockage in the water or air supply by having air and water cooled after-coolers in series or parallel.

7 Claims, 2 Drawing Sheets

(56) References Cited

U.S. PATENT DOCUMENTS

| | | | | |
|---|---|---|---|---|
| 8,187,370 | B2 * | 5/2012 | Dunn | F25B 43/02 184/6.23 |
| 8,978,400 | B2 | 3/2015 | Dunn et al. | |
| 2003/0010574 | A1 | 1/2003 | Longsworth | |
| 2005/0268641 | A1 * | 12/2005 | Dekiya | F25B 9/14 62/468 |
| 2007/0253854 | A1 * | 11/2007 | Dunn | F04C 18/0207 418/55.6 |
| 2007/0261682 | A1 * | 11/2007 | Smith | F02B 29/0443 123/563 |
| 2008/0011550 | A1 * | 1/2008 | Dunn | F25B 43/02 184/6.23 |
| 2011/0107790 | A1 * | 5/2011 | Dunn | F04B 39/06 62/507 |
| 2012/0125023 | A1 | 5/2012 | Kopko et al. | |
| 2013/0145781 | A1 | 6/2013 | Liu | |
| 2016/0320117 | A1 * | 11/2016 | Kanazawa | F25B 31/006 |
| 2017/0176055 | A1 * | 6/2017 | Seitz | F25B 1/00 |

OTHER PUBLICATIONS

U.S Office Action dated May 25, 2017, from related U.S. Appl. No. 14/974,741.

U.S Office Action dated Oct. 10, 2017, from related U.S. Appl. No. 14/974,741.

U.S Office Action dated May 23, 2018, from related U.S. Appl. No. 14/974,741.

U.S Notice of Allowance dated Nov. 15, 2018, from related U.S. Appl. No. 14/974,741.

International Search Report and Written Opinion of the International Searching Authority dated Apr. 3, 2017 from the corresponding International Application No. PCT/US2016/067089.

* cited by examiner

HELIUM COMPRESSOR WITH DUAL AFTER-COOLERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

This invention relates generally to helium compressor units for use in cryogenic refrigeration systems operating on the Gifford McMahon (GM) and Brayton cycles. More particularly, the invention relates to dual after-coolers that provide redundancy between water cooling and air cooling if there is a blockage in the water or air supply.

2. Description of the Related Art

The basic principal of operation of a GM cycle refrigerator is described in U.S. Pat. No. 2,906,101 to McMahon, et al. A GM cycle refrigerator consists of a compressor that supplies gas at a discharge pressure to an inlet valve which admits gas to an expansion space through a regenerator, expands the gas adiabatically within a cold end heat exchanger where it receives heat from an object being cooled, then returns the gas at low pressure to the compressor through the regenerator and an outlet valve. The GM cycle has become the dominant means of producing cryogenic temperatures in small commercial refrigerators primarily because it can utilize mass produced oil-lubricated air-conditioning compressors to build reliable, long life, refrigerators at minimal cost. GM cycle refrigerators operate well at pressures and power inputs within the design limits of air-conditioning compressors, even though helium is substituted for the design refrigerants. Typically, GM refrigerators operate at a high pressure of about 2 MPa, and a low pressure of about 0.8 MPa. The cold expander in a GM refrigerator is typically separated from the compressor by 5 m to 20 m long gas lines. The expanders and compressors are usually mounted indoors and the compressor is usually cooled by water, most frequently water that is circulated by a water chiller unit. Air cooled compressors that are mounted indoors are typically cooled by air conditioned air which is in the temperature range of 15° C. to 30° C.

A system that operates on the Brayton cycle to produce refrigeration consists of a compressor that supplies gas at a discharge pressure to a heat exchanger, from which gas is admitted to an expansion space through an inlet valve, expands the gas adiabatically, exhausts the expanded gas (which is colder) through in outlet valve, circulates the cold gas through a load being cooled, then returns it to the compressor at a low pressure through the heat exchanger. Brayton cycle refrigerators operating at cryogenic temperatures can also be designed to operate with the same compressors that are used for GM cycle refrigerators.

Disadvantageously, compressors designed for air-conditioning service require additional cooling when compressing helium because monatomic gases including helium get a lot hotter when compressed than standard refrigerants. U.S. Pat. No. 7,674,099 describes a means of adapting a scroll compressor manufactured by Copeland Corp. to injecting oil along with helium into the scroll such that about 2% of the displacement is used to pump oil. Approximately 70% of the heat of compression leaves the compressor in the hot oil and the balance in the hot helium.

The Copeland compressor is oriented horizontally and requires an external bulk oil separator to remove most of the oil from the helium. Another scroll compressor that is widely used for compressing helium is manufactured by Hitachi Inc. The Hitachi compressor is oriented vertically and brings the helium and oil directly into the scroll through separate ports at the top of the compressor and discharges it inside the shell of the compressor. Most of the oil separates from the helium inside the shell and flows out of the shell near the bottom while the helium flows out near the top. Helium compressor systems that use the Copeland and Hitachi scroll compressors have separate channels in one or more after-coolers for the helium and oil. Heat is transferred from the oil and helium to either air or water. The cooled oil is returned to the compressor and the cooled helium passes through a second oil separator and an adsorber before flowing to the expander. U.S. Pat. No. 7,674,099 shows after-cooler 8 as being a single heat exchanger cooled by water. This is a typical arrangement for helium compressor systems that operate indoors where chilled water is available. Some helium compressor systems have air cooled after-coolers located indoors but they put an extra heat load on the air conditioning system so it is more typical to have air cooled after-coolers mounted outdoors, either integral with the compressor or separate from the compressor. U.S. Pat. No. 8,978,400 shows an arrangement with a Hitachi scroll compressor that has the oil cooler outdoors cooled by air and all the other components indoors with the helium cooled either by air or water. As explained in the '400 patent, keeping all of the components that have helium in them indoors in an air condition environment, where the temperature is in the range of 15° C. to 30° C. , minimizes the contaminants that evolve from hot oil and increases the life of the final adsorber.

Patent DE3023925 describes a helium compressor system with a water cooled after-cooler which has an option to cool the water with an air cooled heat exchanger and a pump that circulates the water. This arrangement adds the temperature difference of the helium/oil-to-water heat exchanger to the water-to-air heat exchanger and results in higher helium and oil temperatures that release more contaminants into the helium.

SUMMARY OF THE INVENTION

The objective of this invention is to provide redundancy in the after-cooler of a helium compressor operating with an expander, preferably a GM cycle expander, to produce refrigeration at cryogenic temperatures. An important application is cooling of superconducting MRI magnets which operate at temperatures near 4K and require very reliable operation. Most MRI systems are located in hospitals and have chilled water available, so the primary after-cooler in the helium compressor is water cooled. In the event of a failure in the water cooling system this invention provides backup cooling using an air cooled after-cooler. A preferred option is to have the air cooled after-cooler in series with the water cooled after-cooler and a second option is to have the two after-coolers in parallel.

DESCRIPTION OF THE PREFERRED EMBODIMENTS

Figure 1:
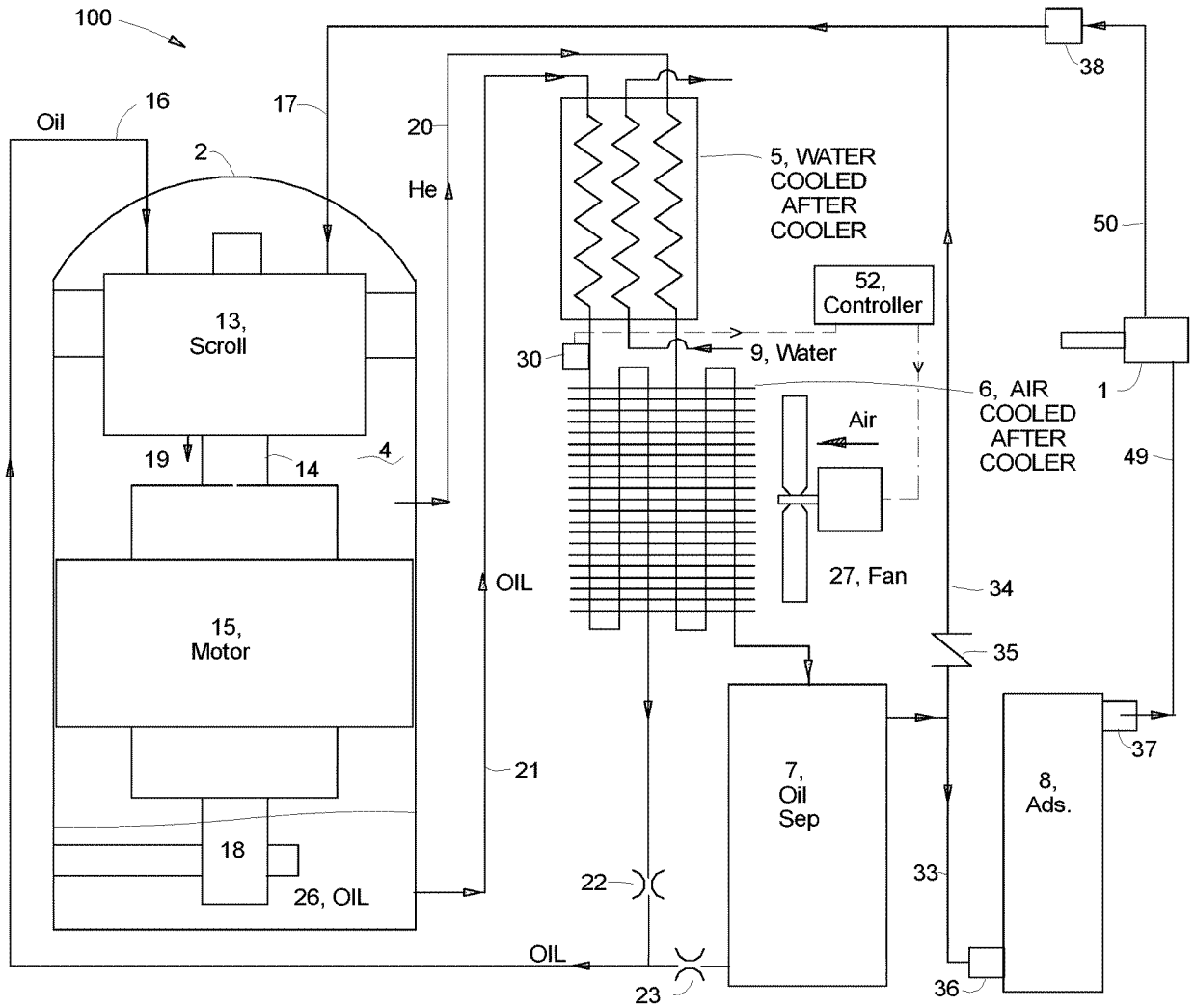
FIG. 1 is a schematic diagram of an oil-lubricated helium compressor system that has an air cooled after-cooler in series with a water cooled after-cooler.

Parts that are the same or similar in the drawings have the same numbers and descriptions are not repeated.

Figure 2:
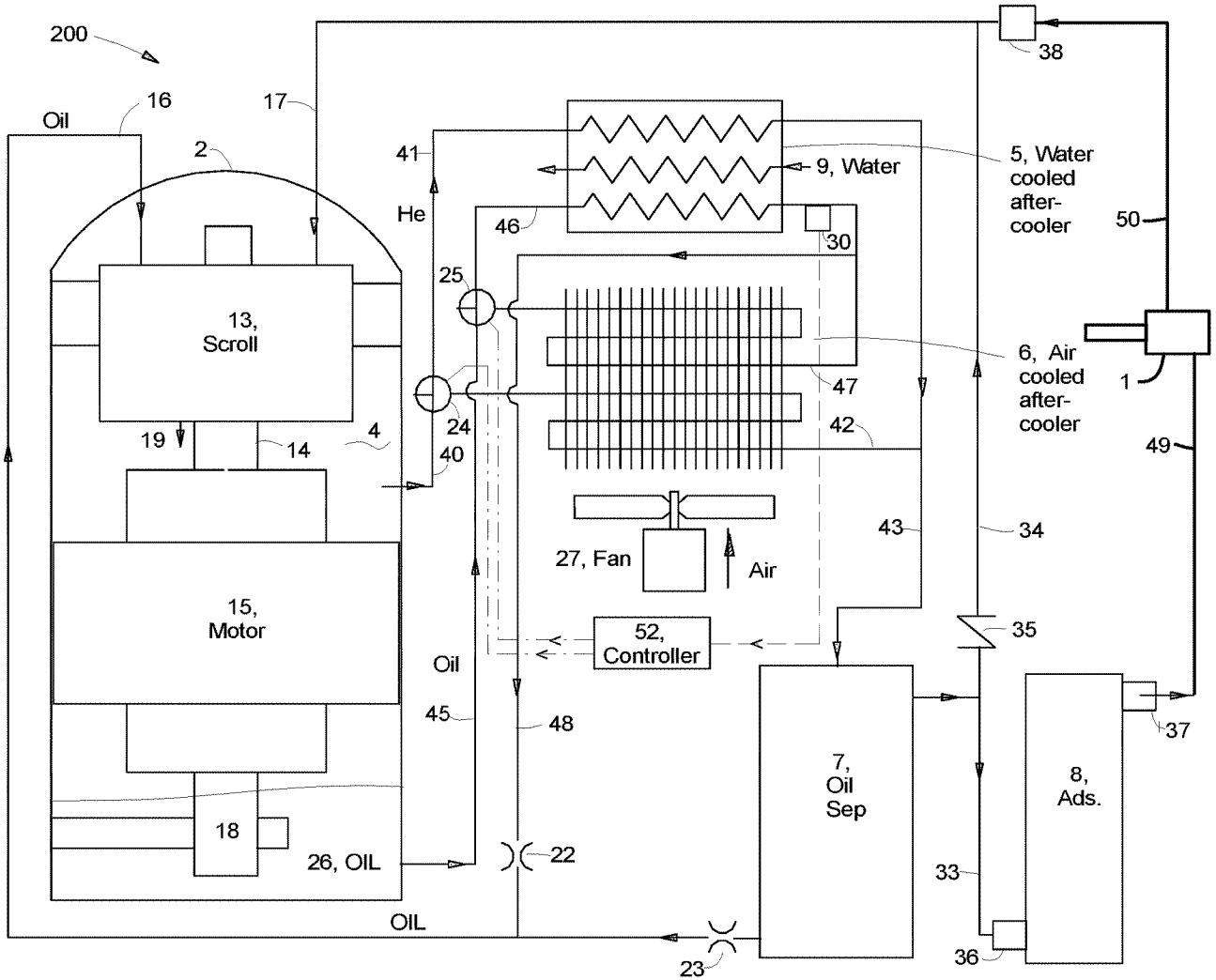
FIG. 2 is a schematic diagram of an oil-lubricated helium compressor system that has an air cooled after-cooler in parallel with a water cooled after-cooler.

FIG. 1 is a schematic diagram of an oil-lubricated helium compressor system that has an air cooled after-cooler in series with a water cooled after-cooler and FIG. 2 is a schematic diagram of an oil-lubricated helium compressor system that has an air cooled after-cooler in parallel with a water cooled after-cooler. These figures show the vertical Hitachi scroll compressors but the schematics for the horizontal Copeland compressors are similar.

Compressor system components that are common to all of the figures are: compressor shell 2, high pressure volume 4 in the shell, compressor scroll 13, drive shaft 14, motor 15, oil pump 18, oil in the bottom of the compressor 26, oil return line 16, helium return line 17, helium/oil mixture discharge from the scroll 19, oil separator 7, adsorber 8, main oil flow control orifice 22, orifice 23 which controls the flow rate of oil from the oil separator, gas line 33 from oil separator 7 to adsorber 8 and internal relief valve 35, gas line 34 from internal relief valve 35 to helium return line 17, adsorber inlet gas coupling 36, adsorber outlet gas coupling 37 which supplies high pressure helium to expander 1 through line 49, and returns gas at low pressure to the compressor through line 50, coupling 38, And line 17.

Compressor system 100 in FIG. 1 shows water cooled after-cooler 5 in series with air cooled after-cooler 6. High pressure helium flows from compressor 2 through line 20 which extends through after-coolers 5 and 6 to oil separator 7. High pressure oil flows from compressor 2 through line 21 which extends through after-coolers 5 and 6 to main oil control orifice 22. Cooling water 9 flows through after-cooler 5 in a counter-flow heat transfer relation with the helium and oil. Fan 27 drives air through after-cooler 6 in a counter-flow heat transfer relation with the helium and oil.

Applications for this system are typically indoors where chilled water at temperatures between 10° C. and 30° C. is available and water cooled after-cooler 6 is the primary cooler. Helium and oil typically leave after-cooler 5 near room temperature so fan 27 can be allowed to run continuously without transferring a significant amount of heat either to or from the air. Having the fan run continuously provides redundancy in the event that the water circuit is blocked without having to take any action. Another option is to sense the temperature of the helium and/or oil leaving water cooled after-cooler 5 and have a control circuit 52 that turns fan 27 on when the temperature exceeds a defined temperature and turns fan 27 off when the temperature drops below the defined temperature. Such a temperature sensor might be mounted as shown for sensor 30.

FIG. 2 is a schematic diagram of compressor system 200. It shows a schematic diagram of an oil-lubricated helium compressor system that has air cooled after-cooler 6 in parallel with water cooled after-cooler 5. Helium flows at high pressure from compressor 2 through line 40 to three-way valve 24 which is shown in a position that allows the helium to flow in line 41 through water cooled after-cooler 5 then connecting through line 43 to oil separator 7. Oil flows at high pressure from compressor 2 through line 45 to three-way valve 25 which is shown in a position that allows the oil to flow in line 46 through water cooled after-cooler 5 then connecting through line 48 to main oil control restrictor 22. To divert helium and oil from flowing through after-cooler 5 to air cooled after-cooler 6, three-way valves 24 and 25 are rotated 90° counter clockwise. When the valves are switched, helium flows in line 42 through air cooled after-cooler 6 then through line 43 to oil separator 7, and oil flows in line 47 through air cooled after-cooler 6 then through line 48 to main oil control restrictor 22. The switching of the valves can be manual or automatic and controlled on the basis of temperature sensor 30 as described above. Fan 27 would be turned on when helium and oil are flowing through air cooled after-cooler 6. The control system that determines which after-cooler is being used, when there is a fault, when to switch from one after-cooler to the other, when to turn the fan on and off, and when to open and close a water supply valve, may be either be included as part of the compressor system or located in an external control system.

The preference for having the water cooled after-cooler as the primary cooler is typical but there may be circumstances when the air cooled after-cooler is the primary cooler and the water cooled after-cooler is used as a backup. It is also possible that the air cooled after-cooler is used in the winter to help heat the building and the water cooled after-cooler is used in the summer to minimize the load on the air conditioner. Some MRI magnets are kept cold during transport by running the refrigerator using the air cooled compressor because electrical power is available but not cooling water.

While this invention has been described in most detail for GM cycle refrigerators cooling MRI magnets at 4K it is also applicable to Brayton cycle refrigerators and applications such as cooling cryopumping panels at 150K. It will further be understood that it is capable of further modification, uses and/or adaptations, following in general the principal of the invention, and including such departures from the present disclosure as come within known or customary practice in the art to which the invention pertains, and as may be applied to the essential features herein before set forth, as fall within the scope of the invention or the limits of the appended claims. Also, it is to be understood that the phraseology and terminology employed herein, as well as the abstract, are for the purpose of description and should not be regarded as limiting.

It is also understood that the following claims are intended to cover all of the generic and specific features of the invention described herein.

What is claimed is:

1. A method of operating an oil-lubricated helium compressor system located in an indoor environment, the compressor system comprising;

a compressor;

a separator internal or external to the compressor that receives a mixture of compressed helium and oil and discharges helium and oil through separate ports, a water cooled after-cooler for effecting cooling of the helium and oil;

an air cooled after-cooler for effecting cooling of the helium and oil, and the air cooled after-cooler comprising a heat exchanger and a fan, the water cooled after-cooler and the air cooled after-cooler connected in series;

one or more sensors connected to a controller programed to detect a fault in the water cooled after-cooler, a first line extending from the helium discharge port and passing through the water cooled after-cooler and the air cooled after-cooler, the helium being cooled by one or both the water cooled after-cooler and the air cooled after-cooler; and a second line extending from the oil discharge port and passing through the water cooled after-cooler and the air cooled after-cooler, the oil being cooled by one or both the water cooled after-cooler and the air cooled after-cooler;

wherein the first line and the second line are separate; the method comprising the steps of:

(a) running the compressor with water flowing through the water cooled after-cooler, (b) detecting a fault in the water cooled after-cooler, (c) turning on the fan.

2. The method in accordance with claim 1, further comprising the step of having the *fan* on all the time.

3. A method of operating an oil-lubricated helium compressor system located in an indoor environment, the compressor system comprising;

a compressor;

a separator internal or external to the compressor that receives a mixture of compressed helium and oil and discharges helium and oil through separate ports, a water cooled after-cooler, an air cooled alter-cooler;

one or more sensors connected to a controller programed to detect a fault in the water cooled after-cooler, a first line extending from the helium discharge port and passing through a three-way valve then one of the water cooled after-cooler and the air cooled after-cooler, the helium being cooled by the respective water cooled after-cooler or the air cooled after-cooler; and a second line extending from the oil discharge port and passing through a three-way valve then one of the water cooled after-cooler and the air cooled after-cooler, the oil being cooled by the respective water cooled after-cooler or the air cooled alter-cooler;

wherein the first line and the second line are separate[.], the method comprising the steps of:

(a) running the compressor with the helium and oil being cooled by the water cooled after-cooler, (b) detecting a fault in the water cooled after-cooler, (c) switching the flow of helium and oil from the water cooled after-cooler to the air cooled after-cooler.

*4. An oil lubricated helium compressor system which is located in an indoor environment where the ambient air temperature is between 15° C. and 30° C., the compressor system comprising:*

*a compressor;*

*a separator internal or external to the compressor that receives a mixture of compressed helium and oil and discharges helium and oil through separate ports;*

*a water cooled after-cooler for effecting cooling of the helium and oil;*

*an air cooled after-cooler for effecting cooling of the helium and oil, the air cooled after-cooler comprising a heat exchanger and a fan, the water cooled after-cooler and the air cooled after-cooler connected in series;*

*a first line extending from the helium discharge port and passing through the water cooled after-cooler and the air cooled after-cooler, the helium being cooled by one or both the water cooled after-cooler and the air cooled after-cooler;*

*a second line extending from the oil discharge port and passing through the water cooled after-cooler and the air cooled after-cooler, the oil being cooled by one or both the water cooled after-cooler and the air cooled after-cooler, wherein the first line and the second line are separate;*

*a temperature sensor mounted downstream of the water cooled after-cooler, wherein the temperature sensor senses temperature of the helium or oil leaving the water cooled after-cooler; and*

*a controller configured to turn on the fan when the temperature exceeds a defined temperature.*

*5. The compressor system in accordance with claim 4, wherein the first line and the second line pass through the water cooled after-cooler before the air cooled after-cooler.*

*6. An oil-lubricated helium compressor system located in an indoor environment where the ambient air temperature is between 15° C. and 30° C., the compressor system comprising:*

*a compressor;*

*a separator internal or external to the compressor that receives a mixture of compressed helium and oil and discharges helium and oil through separate ports;*

*a water cooled after-cooler;*

*an air cooled after-cooler connected in parallel to the water cooled after-cooler;*

*a first line extending from the helium discharge port and passing through a three-way valve then one of the water cooled after-cooler and the air cooled after-cooler, the helium being cooled by the respective water cooled after-cooler or the air cooled after-cooler;*

*a second line extending from the oil discharge port and passing through a three-way valve then one of the water cooled after-cooler and the air cooled after-cooler, the oil being cooled by the respective water cooled after-cooler or the air cooled after-cooler, wherein the first line and the second line are separate;*

*a temperature sensor mounted downstream of the water cooled after-cooler, wherein the temperature sensor senses temperature of helium or oil leaving the water cooled after-cooler; and*

*a controller configured to turn on the fan and to switch the three-way valves so the helium and oil flow through the air cooled after-cooler, when the temperature exceeds a defined temperature.*

*7. The oil-lubricated helium compressor system in accordance with claim 6, wherein the oil and helium flow through one of the air cooled and water cooled after-coolers.*

* * * * *